July 31, 1945.  T. P. BACON, JR.  2,380,380
TIRE VULCANIZING APPARATUS
Filed Dec. 7, 1942   2 Sheets-Sheet 1

INVENTOR.
THOMAS P. BACON, JR.
BY George B. White

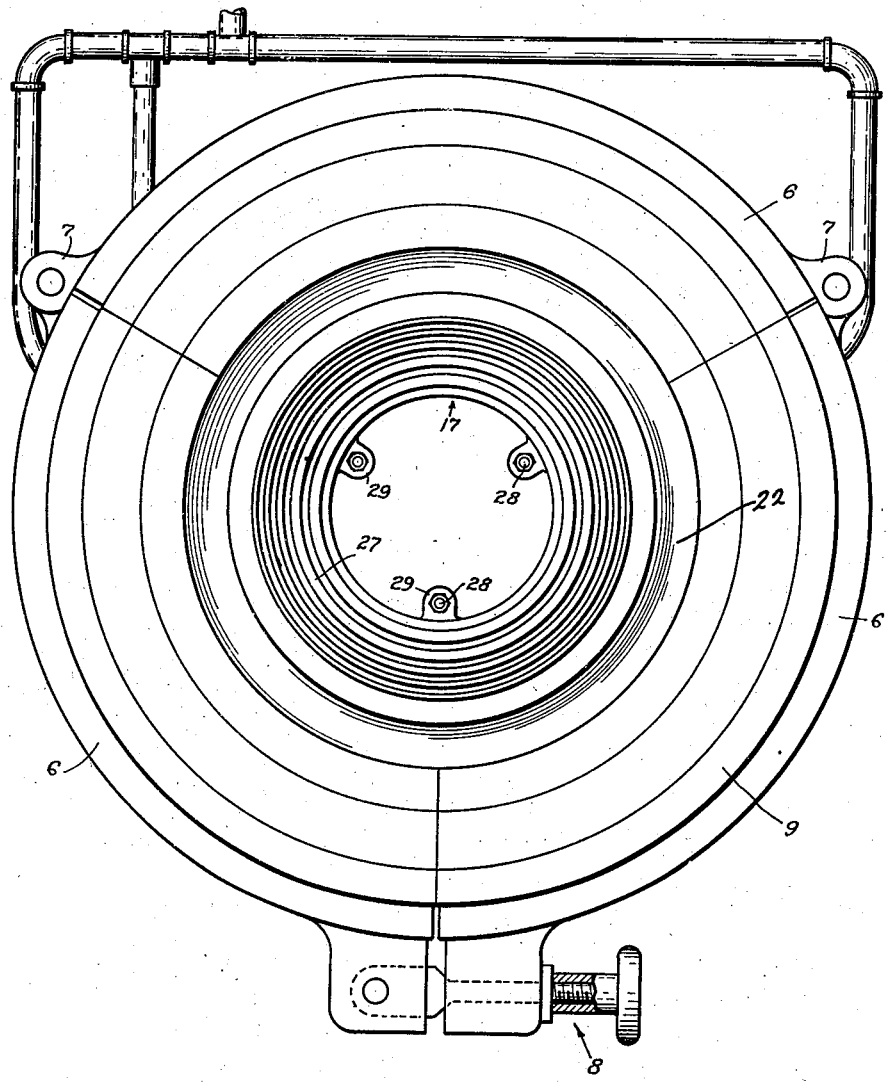

Patented July 31, 1945

2,380,380

UNITED STATES PATENT OFFICE 2,380,380

TIRE VULCANIZING APPARATUS

Thomas P. Bacon, Jr., Oakland, Calif.

Application December 7, 1942, Serial No. 468,319

2 Claims. (Cl. 18—18)

This invention relates to an apparatus for vulcanizing treads on tires.

An object of this invention is to provide a tire rim for use in curing tires, which rim is so formed as to prevent excessive bulging or lateral distortion of the tire while in the curing mold, and also to carry away heat from the tire to such a degree as to prevent overcuring of the weaker sides of the tire and thus to permit the curing of the tire with standard inner tubes instead of special curing bags now in use.

Another object of the invention is to provide a mold cavity or matrix for curing molds with flanges extended in such proximity of oppositely extended side flanges of a curing rim as to maintain the tire in substantial normal rounded position and to prevent the lateral distortion or excessive bulging of the tire during the curing operation.

Another object of the invention is to provide a system of passages in the curing cavity of the matrix of the mold so arranged as to carry away liberated gases or air from the tread surface during curing and also to form a protuberant design on the traction surface of the tire.

Another object of this invention is to provide a tire curing rim and mold which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 3 is a plan view of the mold and of the curing rim in curing position.

In the herein illustrative embodiment of my invention, I show a full circle mold made of three arcuate sections 6 which complement each other into a circular mold when closed. The mold sections 6 are heated in any suitable manner. The sections are hinged together at 7 and are clamped in curing position by a suitable clamping device shown in Fig. 3 at 8.

Figure 1:
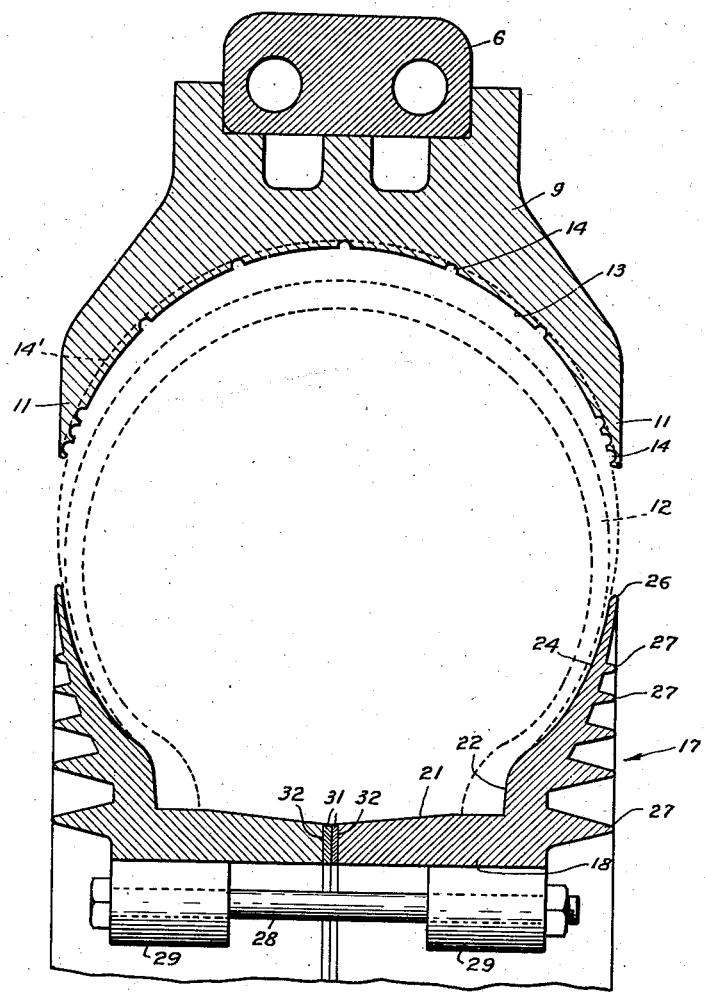
Fig. 1 is a cross sectional view of the curing rim in combination with the matrix in a tire mold.
Figure 2:
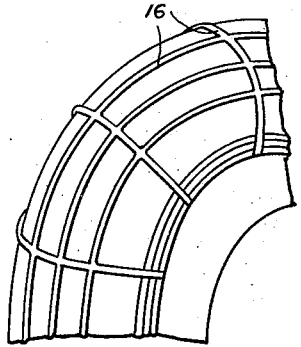
Fig. 2 is a fragmental perspective view of the finished tire, indicating the design lines formed on the surface of the tire by the gas relieving passages of the mold.

Inside of the mold sections 6 are matrix sections 9 which may be of any usual construction, but of slightly smaller inner diameter than the tire diameter when fully inflated. The distinguishing feature of the matrices in this mold reside in the arrangement of side flanges 11 which extend to a substantial distance over the sides of the tire indicated in broken lines at 12 in Fig. 1. These flanges 11 taper to a narrow edge as shown. Inside of the curing cavity 13 of the matrices 9, is a system of gas relieving passages 14. These passages 14 consist of grooves in the curing cavity 13. Certain of the grooves extend circumferentially so as to form continuous circumferential grooves 14 around the entire periphery of the tire. Transverse grooves 14' extend across the entire arcuate width of the curing cavity 13 and to the edges of the flanges 11. By this system of grooves 14 and 14', the air trapped in the curing cavity 13 and the gases developed during the curing of the rubber are conducted along the circumferential grooves 14 and then through the transverse grooves 14' out from the curing cavity 13 at the narrow edges of the matrix flanges 11. The gases and oxides forced out of these grooves 14 and 14' by the pressure of the rubber during curing, are replaced by the rubber tread material and form a tread design on the periphery of the tire cured in such matrices. It is to be noted that adjacent the inner edges of the matrix flanges 11 there are provided a plurality of circular grooves 14 in close proximity so as to provide the ridges which usually indicate the termination of the tread design at the sides of the tire. The protuberances 16 thus created on the surface of the tire are indicated in Fig. 2.

The curing rim illustrated in this application is shown to cooperate with the matrices of this particular type of mold, but it is understood that the herein curing rim may be used in connection with various other types of molds and matrices. This curing rim is made of a pair of circular sections 17. Each section has a rim 18 and a circular flange 19 extending all around the outer edge of the rim 18. The rim 18 has its outer peripheral face 21 formed so that it inclines from the flange 19 toward the center edge of the curing rim 18. The flange 19 has a corner 22 thereon joining the outer end of the inclined rim face 21. When the tire 12 is placed on such rim and is inflated, then the beads 23 of the tire 12 are wedged outwardly into the corner formed between the flange face 22 and the rim face 21. This facilitates the putting of the tire in the rim and also firmly wedges the tire beads in place when the tire is inflated. The inner surface of each flange 19 is curved at 24 so as to substantially conform to the curvature of the tire above the bead and to lead at a true radius of said tire curvature to the bead. The flange 19 tapers outwardly to a comparatively narrow edge 26, and is of such height that the edge 26 is located at about the portion of the sides of the tire 12 where the tire is the widest when inflated.

In order to accelerate the carrying away of the heat from the sides of the tire, the rim flanges 19 are provided on their outer periphery with cooling fins 27. In this illustration the cooling fins 27 are arranged in concentric circles. It was found that curing rims so constructed protect the tire against excessive bulging or distortion and also cool the sides of the tire to such an extent that the regulation inner tube can be used while the tire is cured without any injury either to the tube or to the tire. In fact, in actual practice the usual curing temperature of the tire was reduced by the use of these cured rims by as much as 130° Fahrenheit, namely, from about 220° Fahrenheit to about 90° Fahrenheit.

The annular rim sections are held together by bolts 28 which extend transversely at spaced points of the inner periphery of the respective rims 18. These bolts 28 work in lugs 29 which extend in aligned positions from the inner peripheries of the respective rims 18, as shown.

The herein described curing rims are adjustable as to width by the insertion of spacer rings 31 which can be placed as desired between the meeting edges 32 of the rim sections 18. The curing rims herein are made of a good heat conducting material, such as aluminum.

I claim:

1. A tire mold forming an annular curing cavity and having a system of intercommunicating escape grooves in the walls of said curing cavity including circumferential grooves and transverse grooves, said transverse grooves intersecting said circumferential grooves and extending across said cavity to and through the inner peripheral edges of said curing cavity to conduct gaseous substances to the outside from between the walls of said curing cavity and the surface of the tire therein and to mold a traction design on said tire surface.

2. A tire mold forming an annular curing cavity and having a system of intercommunicating escape grooves in the walls of said curing cavity including circumferential grooves and transverse grooves, said transverse grooves intersecting said circumferential grooves and extending across said cavity to and through the inner peripheral edges of said curing cavity to conduct gaseous substances to the outside from between the walls of said curing cavity and the surface of the tire therein and to mold a traction design on said tire surface, a set of circumferential grooves being located at each inner peripheral edge of the curing cavity to form terminating ridges for the tread design, said sets of grooves being also intersected by said transverse grooves.

THOMAS P. BACON, Jr.